No. 784,474. Patented March 7, 1905.

UNITED STATES PATENT OFFICE.

ARNOLD CORTI, OF DÜBENDORF, NEAR ZURICH, SWITZERLAND.

PAINT-REMOVER AND PROCESS OF MAKING SAME.

SPECIFICATION forming part of Letters Patent No. 784,474, dated March 7, 1905.

Application filed September 1, 1904. Serial No. 223,032.

*To all whom it may concern:*

Be it known that I, ARNOLD CORTI, a citizen of the Republic of Switzerland, residing at Dübendorf, near Zurich, Switzerland, have invented a new and useful Paint-Remover and Process of Making Same, of which the following is a specification.

This invention relates to the manufacture of a composition adapted to be applied, say, by means of a brush to articles or surfaces of wood, metal, stone, or other materials for the purpose of removing therefrom lacquer, varnish, oil-paint, and the like, and more especially burnt lacquers.

The improved composition is manufactured according to this invention by stirring an alcoholic or acetonic mixture of slaked lime with potash or soda into a mixture of petroleum or paraffins and soft soap. It acts upon the coat of lacquer, varnish, or paint which it is desired to remove by dissolving or altering the same in such a manner that after being allowed to remain thereon for a shorter or longer period—say from some minutes, as in the case of ordinary oil-paint, to about two hours, as in the case of burnt lacquers—the coat thus treated can be removed by simply washing it off or by other suitable mechanical means.

The following proportions of mixture of the ingredients of the improved composition are given by way of example: Three hundred parts, by weight, of slaked lime are mixed with seventy-five parts, by weight, of powdered potash or soda, and into this mixture there is stirred a mixture of sixty parts, by weight, of petroleum, seventy-five parts, by weight, of soft soap, and three hundred parts, by weight, of alcohol or acetone. It is recommended to add about four hundred and fifty parts, by weight, of chalk for the purpose of thickening the composition.

Having now particularly described and ascertained the nature of my said invention and in what manner the same is to be performed, I declare that what I claim is—

1. The herein-described composition of matter containing a mixture of alcohol, slaked lime, soda, petroleum and soft soap, substantially as and for the purposes set forth.

2. The herein-described composition of matter containing a mixture of alcohol, slaked lime, soda, petroleum, soft soap and chalk, substantially as and for the purpose set forth.

3. The process, which consists in forming a mixture containing about five hundred parts by weight of alcohol, about three hundred parts by weight of slaked lime and about seventy-five parts by weight of pulverized soda, then forming a mixture of about sixty parts by weight of petroleum and seventy-five parts by weight of soft soap and stirring the first-named mixture into the second.

4. The process, which consists in forming a mixture consisting of about five hundred parts by weight of alcohol, about three hundred parts by weight of slaked lime and about seventy-five parts by weight of pulverized soda, then forming a mixture of about sixty parts by weight of petroleum and seventy-five parts by weight of soft soap and stirring the first-named mixture into the second and finally adding about four hundred and fifty parts by weight of chalk.

In testimony whereof I have signed my name to this specification in the presence of two subscribing witnesses.

ARNOLD CORTI.

Witnesses:
V. BURCH,
JOSEPH SIMON.